US006478083B1

United States Patent
Nanba et al.

(10) Patent No.: US 6,478,083 B1
(45) Date of Patent: Nov. 12, 2002

(54) AUTOMOTIVE AIR CONDITIONING UNIT

(75) Inventors: Yoshiaki Nanba, Kanagawa (JP); Morihiro Takasaki, Tochigi (JP); Kenichiro Sawano, Tochigi (JP); Osamu Kato, Tochigi (JP); Yoshitoshi Noda, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/717,252

(22) Filed: Nov. 22, 2000

(30) Foreign Application Priority Data

Nov. 22, 1999 (JP) .......................... 11-332039
Nov. 22, 1999 (JP) .......................... 11-332056
Nov. 24, 1999 (JP) .......................... 11-333130
Oct. 12, 2000 (JP) .......................... 2000-312083

(51) Int. Cl.$^7$ .................. F25D 21/14; B60H 1/00
(52) U.S. Cl. .............. 165/202; 165/42; 62/285; 62/291
(58) Field of Search .................. 165/42, 202, 41, 165/70; 62/244, 279, 285, 288, 290, 291

(56) References Cited

U.S. PATENT DOCUMENTS

| 5,117,653 | A | * | 6/1992 | Kil .............................. 62/291 |
| 5,410,891 | A | * | 5/1995 | Ripert ....................... 62/288 X |
| 5,669,230 | A | * | 9/1997 | Bruce et al. ................ 62/285 |
| 5,697,227 | A | * | 12/1997 | Bruce et al. ................ 62/285 |
| 5,894,737 | A | * | 4/1999 | Haeck ........................ 62/285 |
| 5,901,566 | A | * | 5/1999 | Macosko et al. ............ 62/285 |
| 5,966,958 | A | * | 10/1999 | Maynard ................. 62/285 X |
| 5,966,959 | A | * | 10/1999 | Stewart ..................... 62/285 |
| 5,987,909 | A | * | 11/1999 | Martin, Sr. ............... 62/288 X |
| 6,029,739 | A | * | 2/2000 | Izawa et al. ................. 165/42 |
| 6,044,656 | A | * | 4/2000 | Shirota et al. ........... 62/285 X |
| 6,085,539 | A | * | 7/2000 | Meyer ........................ 62/285 |
| 6,112,536 | A | * | 9/2000 | Hansen ....................... 62/285 |

* cited by examiner

Primary Examiner—Ljiljana Ciric
(74) Attorney, Agent, or Firm—Foley & Lardner

(57) ABSTRACT

An air conditioning unit is provided comprising a casing including an air flow passage, an evaporator and a heater arranged in the air flow passage, and an air flow control door for controlling an air amount flowing in a heater-passing passage. A water guide groove is provided at a bottom surface of the casing with a slanted bottom. A triangular projection is formed on the bottom surface of the casing, the triangular projection being oriented so that one apex of the projection is directed toward the front wall of the casing.

18 Claims, 16 Drawing Sheets

(KNOWN ART)

PASSENGER ROOM ← → ENGINE ROOM

FRONT →

(KNOWN ART)

AUTOMOTIVE AIR CONDITIONING UNIT

BACKGROUND OF THE INVENTION

1. Field of the Invention

The present invention relates in general to an automotive air conditioner, and more particularly to an automotive air conditioning unit which comprises generally a casing defining therein an air passage with air inlet and outlet openings, an evaporator installed in an upstream portion of the air passage and a heater installed in a downstream portion of the air passage, an air intake unit connected to the air inlet opening of the air passage and an electric blower installed in the air intake unit for producing an air flow directed toward the air outlet opening through the air passage.

2. Description of Prior Art

In order to clarify the task of the present invention, two known automotive air conditioning units will be described with reference to FIGS. 21 and 22 of the accompanying drawings.

In FIG. 21, one known automotive air conditioning unit 3 is shown, which is constructed compact in size for providing front passengers with a larger foot space. The unit 3 generally comprises a casing 6, an evaporator 1 installed in a lower portion of an interior of the casing 6 and a heater 2 installed in a middle portion of the interior. Both the evaporator 1 and the heater 2 are inclined for a compact construction of the unit 3. The casing 6 is formed at a lower part of a side wall thereof with a generally rectangular air inlet opening 4 through which air from an air intake unit (not shown) is introduced into a triangular space provided below the evaporator 1. Between the evaporator 1 and the heater 2, there is arranged a pivot door 5 which controls the ratio between the amount of air directed toward an air mixing chamber AM through the heater 2 and the amount of air directed toward the air mixing chamber AMC bypassing the heater 2.

In FIG. 22, the other known automotive air conditioning unit 3' is shown, which is similar to the above-mentioned unit 3. However, in the unit 3' of this drawing, a slide door 7 is used in place of the above-mentioned pivot door 5. Due to the nature of the slide door 7, compactness of the unit 3' is much assured as compared with that of the unit 3 of FIG. 21.

However, in the above-mentioned known units 3 and 3', under operation, the triangular space defined below the evaporator 1 is subjected to uneven pressure distribution due to the inclined arrangement of the evaporator 1 and the rectangular shape of the air inlet opening 4. The uneven pressure distribution brings about uneven air flow throughout the air passing area of the evaporator 1 and thus lowers the performance of the same.

The reason of the uneven air flow through the evaporator 1 will be briefly described with reference to FIGS. 23 and 24.

FIG. 23 is a plan view of the lower portion of the unit 3 or 3'. That is, due to unbalanced air flow rate between larger and smaller areas of the triangular air inlet opening 4 and unbalanced air flow resistance in the triangular space between one side facing the larger area of the inlet opening 4 and the other side facing the smaller area of the same, there is produced an air swirl "S" at a central portion of the space which causes a pressure drop at such portion. Thus, smoothed air flow is not carried out at a central portion of the evaporator 1. Furthermore, as is seen from FIG. 23, the air flow passing through the larger part "A" of the air inlet opening 4 is subjected to a pressure increase each time it collides against walls "B" and "C" of the case 6, and finally, the pressure is much increased at the point "D" where it collides against the other air flow passing through the smaller part "E" of the opening 4. FIG. 24 is a graph depicting the manner of the air flow through the evaporator 1 with respect to the positions "A" to "E". Pressurized areas are indicated by a shadow. As is seen from this graph, increased air flow appears around an area from the position "B" to the position "C" and around the position "D" and poor air flow appears at the other areas, which causes an uneven air flow through the evaporator 1 and thus lowers the performance of the same.

Usually, as is seen from FIG. 23, a drain pipe 9 is provided at a front wall of the casing 6, which communicates the triangular space of the casing 6 and the interior of the engine room. Thus, under operation of the air conditioner, water drops produced when moisture touches the cold outer surface of the evaporator 1 are led into the engine room. However, due to generation of the air swirl "S" in the space, the water drops or water is not smoothly drained to the engine room through the drain pipe 9. In a worst case, the water drops or water is forced to flow backward toward the air intake unit under a certain running of an associated motor vehicle. This may bring about a trouble of the electric blower in the air intake unit.

SUMMARY OF THE INVENTION

It is therefore an object of the present invention to provide an automotive air conditioning unit which is free of the above-mentioned drawbacks.

A main object of the present invention is to provide an automotive air conditioning unit which can suppress the undesirable backflow of water drop or water toward the air inlet opening.

A second object of the present invention is to provide an automotive air conditioning unit which allows an even air flow throughout the air passing area of the evaporator even when the evaporator is inclined and the air inlet opening is generally triangular in shape.

According to a first aspect of the present invention, there is provided an air conditioning unit which comprises a casing having air inlet and outlet openings which are connected through an air flow passage defined in the casing, the casing including a bottom surface in the vicinity of the air inlet opening; an evaporator arranged in the air flow passage; a heater arranged in the air flow passage at a position downstream of the evaporator; an air flow control door for controlling a ratio between an air amount flowing in a heater-bypassing passage which extends from the evaporator to the air outlet opening bypassing the heater and an air amount flowing in a heater-passing passage which extends from the evaporator to the air outlet opening through the heater; a water guide groove provided at the bottom surface of the casing at a position opposite to the position where the air inlet opening is provided; a drain pipe held by the casing and connected to the water guide groove; and a plurality of water backflow obstruction projections formed on the bottom surface in an area defined between the water guide groove and the air inlet opening, each projection being shaped and oriented so as to obstruct a flow of water in a direction from the water guide groove toward the air inlet opening.

According to a second aspect of the present invention, there is provided an air conditioning unit which comprises a casing having air inlet and outlet openings which are connected through an air flow passage defined in the casing, the casing including a bottom surface in the vicinity of the air inlet opening, the air inlet opening being generally triangular in shape so that the height of one side of the air inlet opening is greater than that of the other side of the same; an evaporator inclined and arranged in the air flow passage; a heater inclined and arranged in the air flow passage at a position downstream of the evaporator; an air flow control door for controlling a rate between an air amount flowing in a heater-bypassing passage which extends from the evaporator to the air outlet opening bypassing the heater and an air amount flowing in a heater-passing passage which extends from the evaporator to the air outlet opening through the heater; a water guide groove provided at the bottom surface of the casing at a position opposite to the position where the air inlet opening is provided, the water guide groove having a slanted bottom; a drain pipe held by the casing and connected to a lower portion of the water guide groove; and a triangular projection formed on the bottom surface of the casing, the triangular projection being oriented so that one apex of the same is directed toward a rear wall of the casing and an opposite side of the apex faces toward a front wall of the casing, the rear and front walls being positioned near the one and the other sides of the air inlet opening respectively.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, embodiments of the present invention will be described in detail with reference to accompanying drawings. Throughout the description, substantially same parts and constructions are denoted by the same numerals. Furthermore, for ease of understanding, the description will include various directional terms, such as right, left, upward, downward, rightward, leftward and the like. However, such terms are to be understood with respect to a drawing or drawings on which the corresponding part or portion is shown.

Referring to FIGS. 1 to 6 of the drawings, there is shown an automotive air conditioning unit 10A which is a first embodiment of the present invention.

Figure 1:
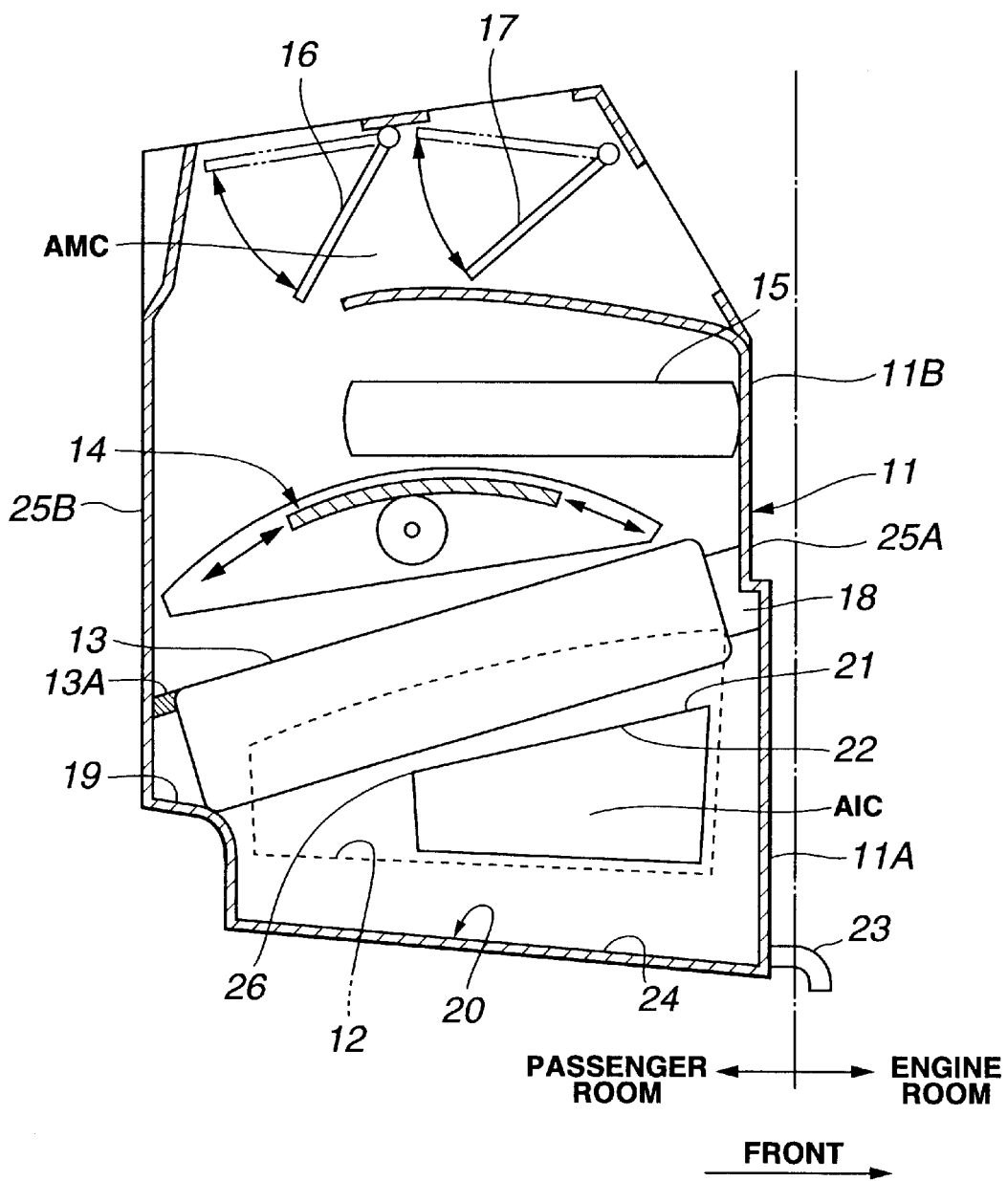
FIG. 1 is an axially and vertically sectional view of an automotive air conditioning unit which is a first embodiment of the present invention.
Figure 2:
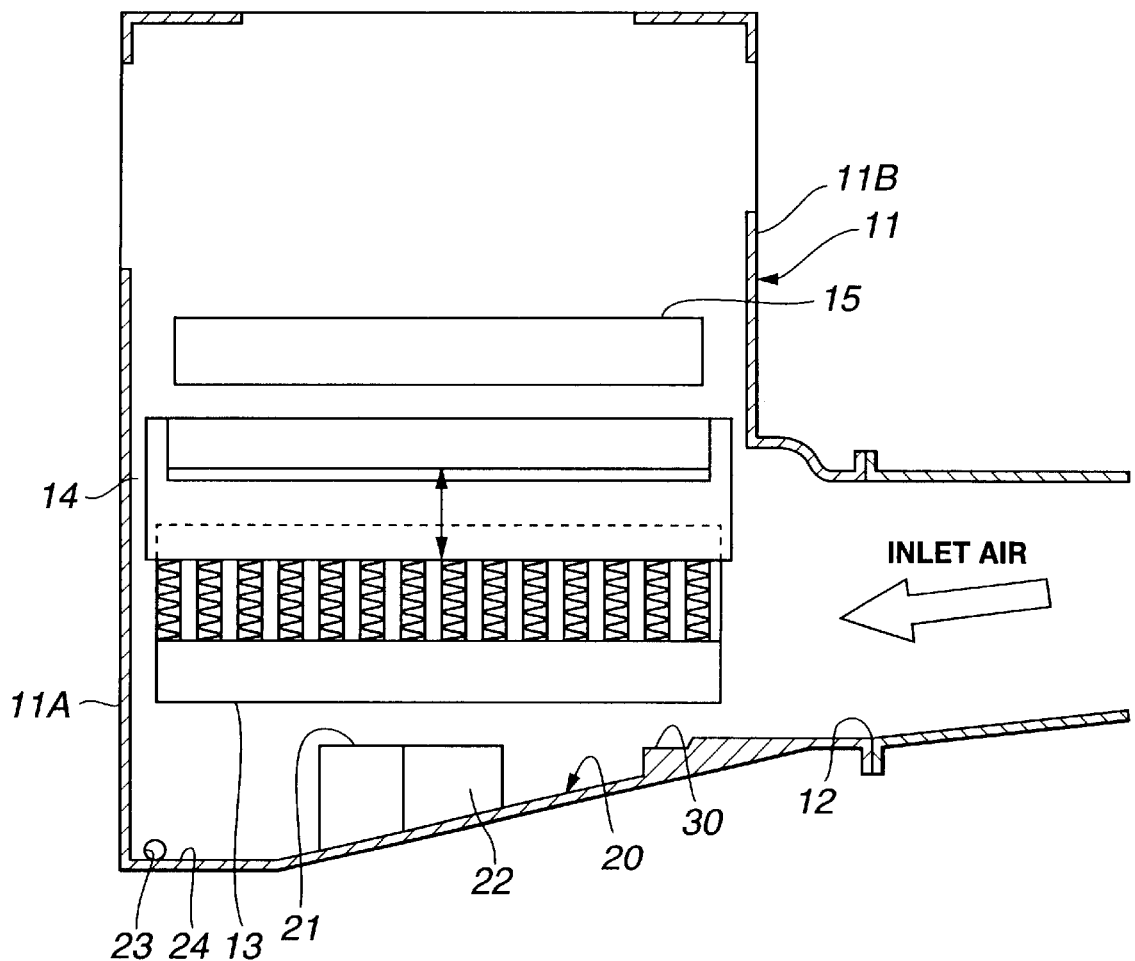
FIG. 2 is a laterally and vertically sectional view of the air conditioning unit of the first embodiment.

As is well shown in FIGS. 1 and 2, the air conditioning unit 10A comprises a casing 11 which includes a lower half part 11A and an upper half part 11B which are detachably connected.

Figure 3:
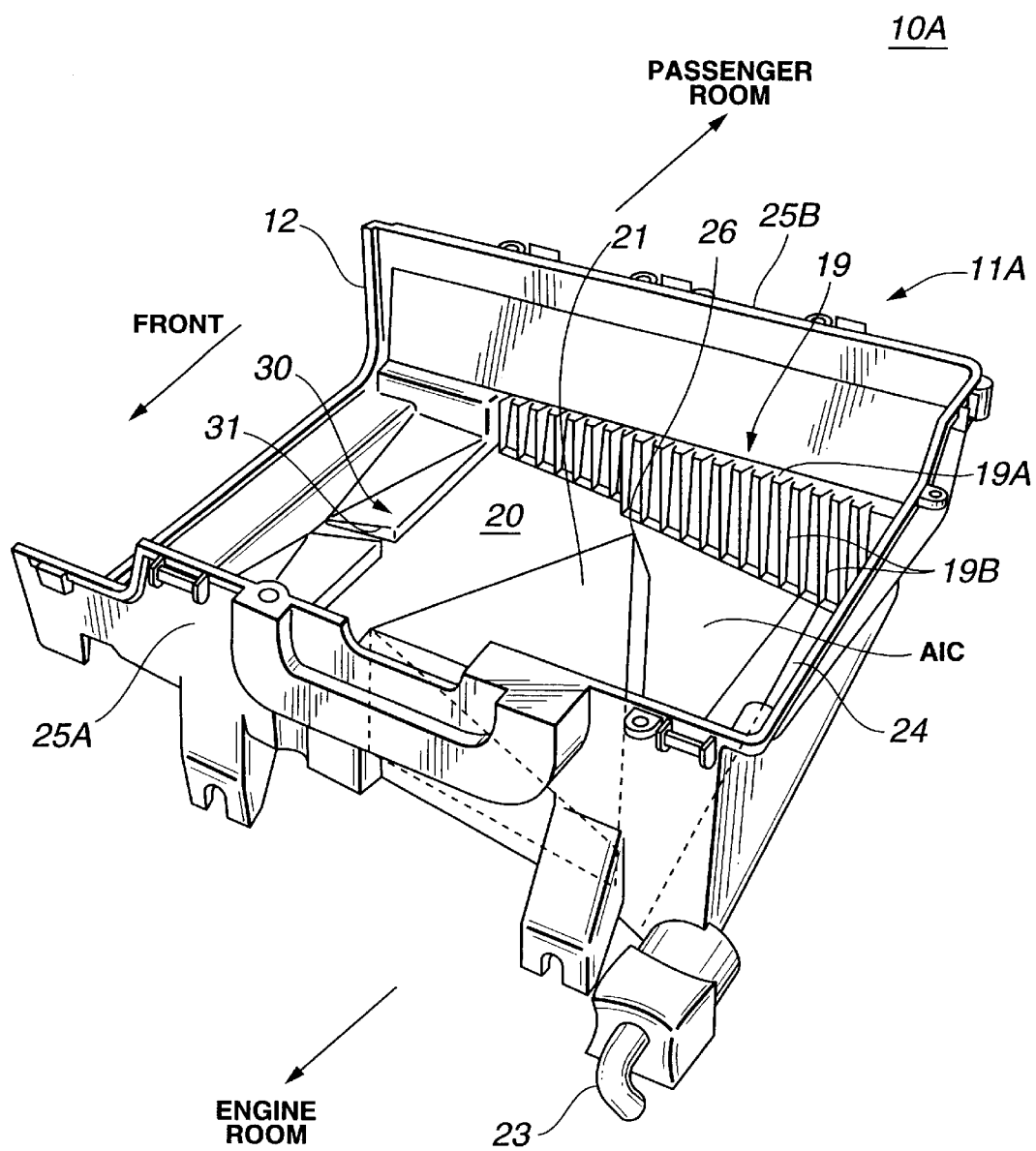
FIG. 3 is a perspective view of a lower half part of the air conditioning unit of the first embodiment.
Figure 4:
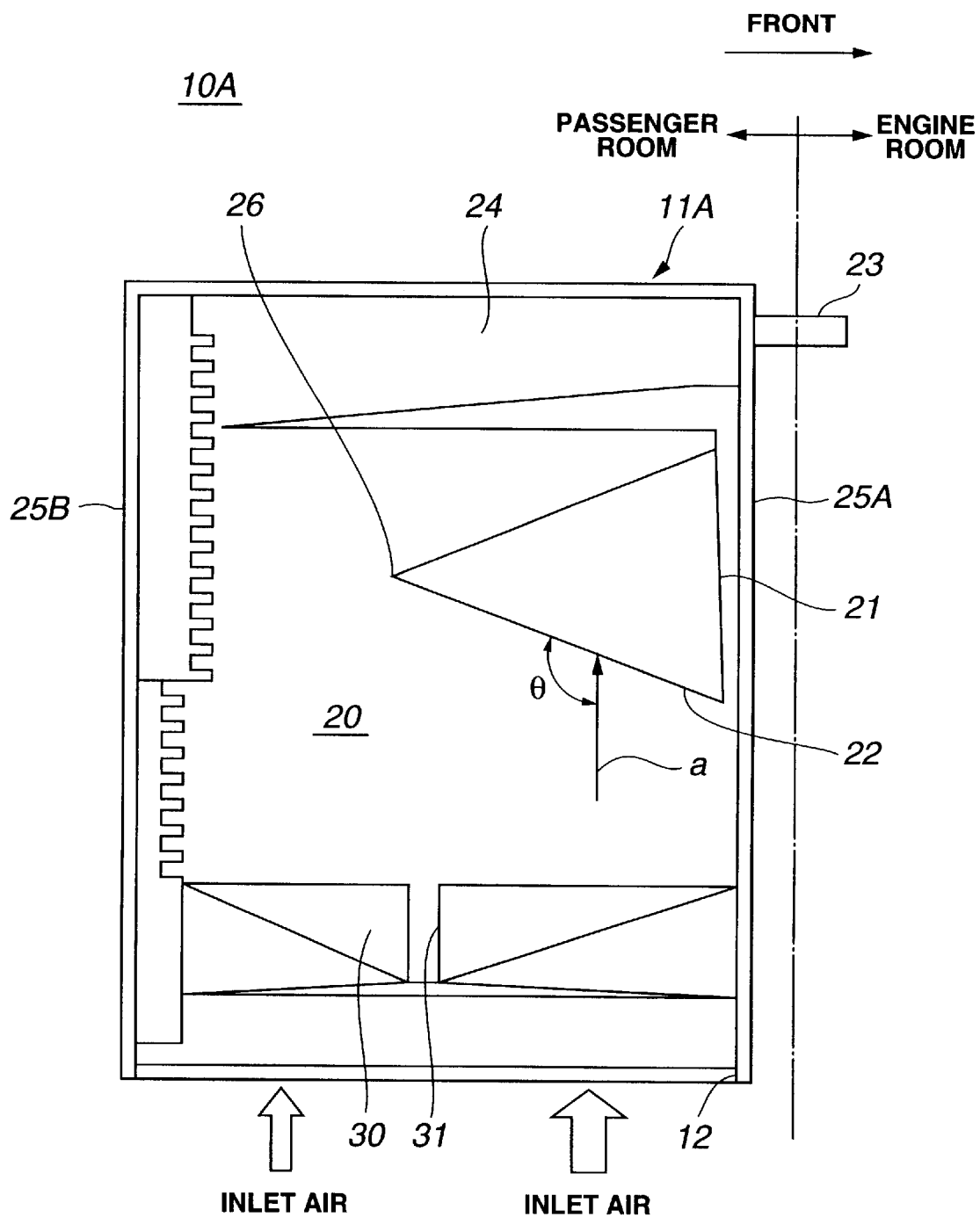
FIG. 4 is a plan view of the lower half part of the air conditioning unit of the first embodiment.

FIG. 3 shows a perspective view of the lower half part 11A of the casing 11. FIG. 4 is a plan view of the lower half part 11A. As is best understood from these drawings, the lower half part 11A is formed at its right side wall with an air inlet opening 12 through which air brown by an electric blower (not shown) installed in an air intake unit (not shown) is led into the lower half part 11A.

As is best shown in FIG. 1, an evaporator 13 is installed in a lower portion of the casing 11, which is inclined with its front portion raised. A rounded slide door 14 is arranged above the evaporator 13, which serves as an air mix door. A heater 15 is arranged above the slide door 14. At a top wall of the casing 11, there are formed air outlet openings (no numerals) which are selectively opened and closed by respective pivot doors 16 and 17.

It is now to be noted that in the casing 11, there are defined two air flow passages, one being a heater-bypassing passage including an inlet chamber "AIC" defined below the evaporator 13, an air mix chamber "AMC" defined below the top wall of the casing 11 and a passage extending between the evaporator 13 and the air mix chamber AMC bypassing the heater 15 and the other being a heater-passing passage including the air inlet chamber "AIC", the air mix chamber "AMC" and a passage extending between the evaporator 13 and the air mix chamber "AMC" passing through the heater 15. The slide door 14 functions to decide an air flow rate between the heater-bypassing passage and the heater-passing passage.

As is seen from FIG. 1, the front raised end of the evaporator 13 is hooked to the upper half part 11B of the casing 11 through a bracket 18, and the rear lowered end of the evaporator 13 is supported on a stepped portion 19 of the lower half part 11A. Although not shown in the drawing, the stepped portion 19 is formed with at least one water guide groove that extends to the bottom surface 20 of the casing 11. Bolts and nuts are used for securing the evaporator 13 to the upper and lower half parts 11B and 11A. Denoted by numeral 13A is a seal packing that extends between the evaporator 13 and the lower half part 11A of the casing 11. As shown, the seat packing 13A is inclined to be flush with a downstream surface of the evaporator 13. With this arrangement, condensed water drops on the upper surface of the evaporator 13 can smoothly flow down to the bottom surface 20 of the casing 11 through the above-mentioned water guide groove.

Although not shown in the drawings, the evaporator 13 constitutes a cooling system by connecting with a compressor, a condenser and an expansion valve. That is, under operation of the cooling system, the evaporator 13 cools air passing therethrough.

The heater 15 is held by the upper half part 11B of the casing 11 at the position above the slide door 14. Engine cooling water from an associated engine (not shown) flows through the heater 15 to heat or warm air passing through the same.

As is understood from FIG. 1, the air inlet opening 12 is generally triangular in shape. The height of the front side of the opening 12 is greater than that of the rear side. As shown, the evaporator 13 is inclined relative to a bottom surface 20 of the lower half part 11A of the casing 11.

As is seen from FIG. 3, on the bottom surface 20 of the lower half part 11A, there is integrally formed a triangular projection 21 which has a slanted surface as will be described in detail hereinafter. The projection 21 can be simultaneously provided when molding the lower half part 11A of the casing 11. As is seen from FIG. 1, between the triangular projection 21 and the evaporator 13, there is left a certain clearance through which air can flow. As shown in FIGS. 3 and 4, one apex 26 of the triangular projection 21 is directed toward the passenger room and an opposite side of the apex faces toward the engine room.

As is seen from FIG. 4, the triangular projection 21 is located near a front wall 25A of the casing 11 and one 22 of the three sides of the projection 21, that faces toward the air inlet opening 12, is inclined by an obtuse angle "θ" with respect to a straight air flow "a" whose flowing direction is perpendicular to the air inlet opening 12. Thus, due to provision of the side 22, air from the air inlet opening 12 is turned toward a rear wall of the casing 11, that is, leftward in the drawing. A drain pipe 23 is connected to a lower part of the front wall 25A of the casing 11 at an opposite position of the air inlet opening 12 with respect to the triangular projection 21, as shown. A water guide groove 24 is formed on the bottom surface 20 of the lower half part 11A of the casing 11, whose bottom is slanted toward the drain pipe 23. As is seen from FIGS. 3 and 4, the bottom surface 20 of the casing 11 is formed near the air inlet opening 12 with a dam structure 30 for suppressing condensed water drops or water on the bottom surface 20 from flowing backward to the air inlet opening 12. The dam structure 30 is formed at a center thereof with a groove 31 through which any overflow water may return back to the bottom surface 20.

As is seen from FIG. 1, the top surface of the triangular projection 21 is inclined up toward the front wall 25A of the casing 11. As shown in FIG. 4, in the illustrated embodiment 10A, the apex 26 of the triangular projection 21 is located slightly rear of the center of the bottom surface 20 of the lower half part 11A of the casing 11.

Figure 5:
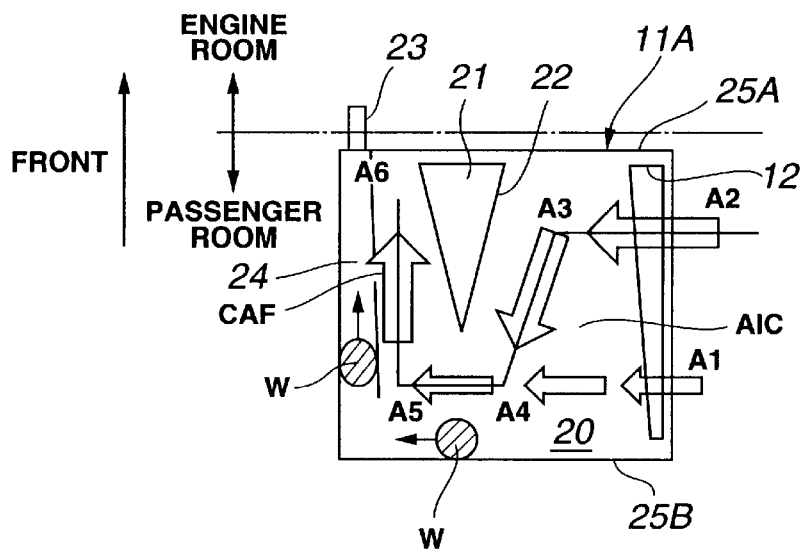
FIG. 5 is an illustration for explaining the manner in which inlet air and condensed water drops behave under operation of the air conditioning unit of the first embodiment.

With the above-mentioned arrangement of the air conditioning unit 10A of the first embodiment, an advantageous operation is obtained, which will be described in the following with reference to FIGS. 5 and 6.

Figure 21:
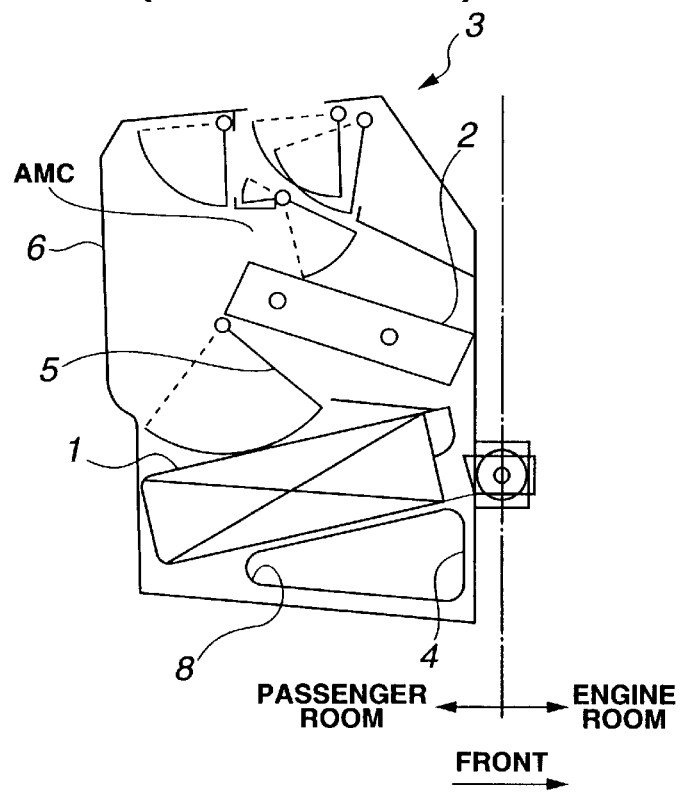
FIG. 21 is an axially and vertically sectional view of one known automotive air conditioning unit.
Figure 22:
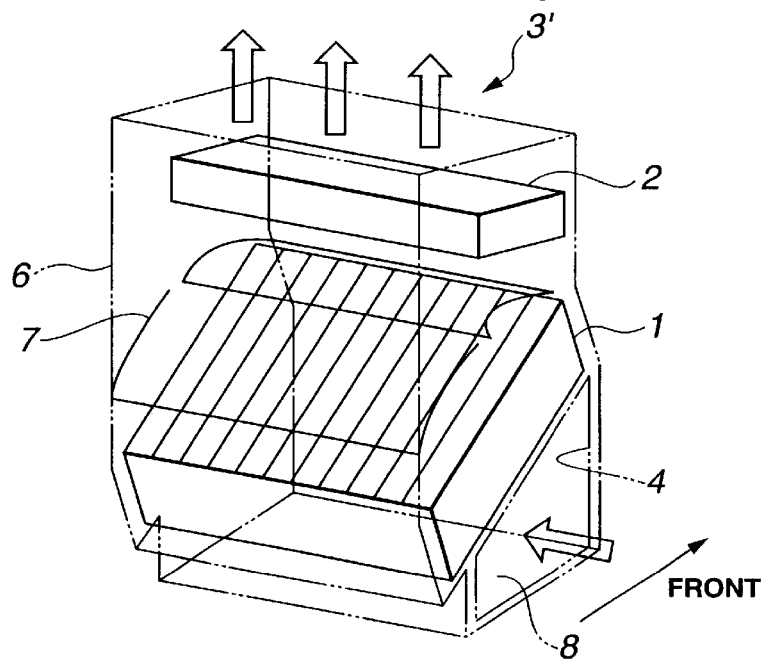
FIG. 22 is a perspective view of another known automotive air conditioning unit.
Figure 23:
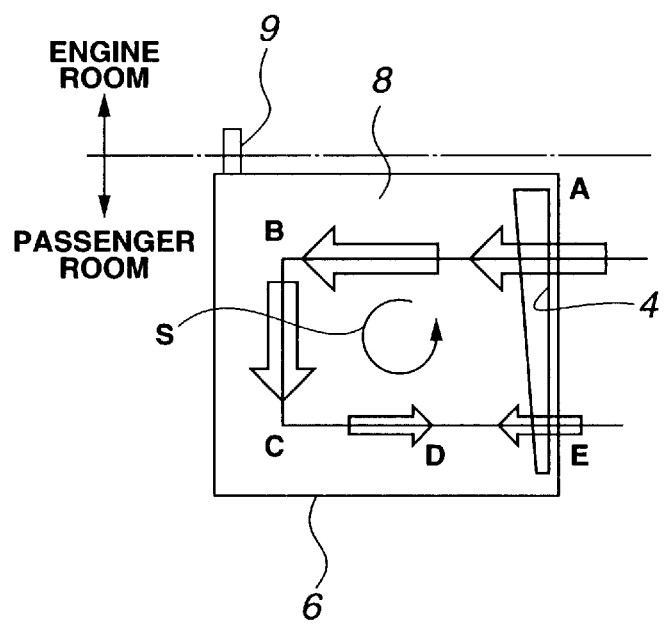
FIG. 23 is an illustration for explaining the manner in which inlet air behaves under operation of the known air conditioning unit.
Figure 24:
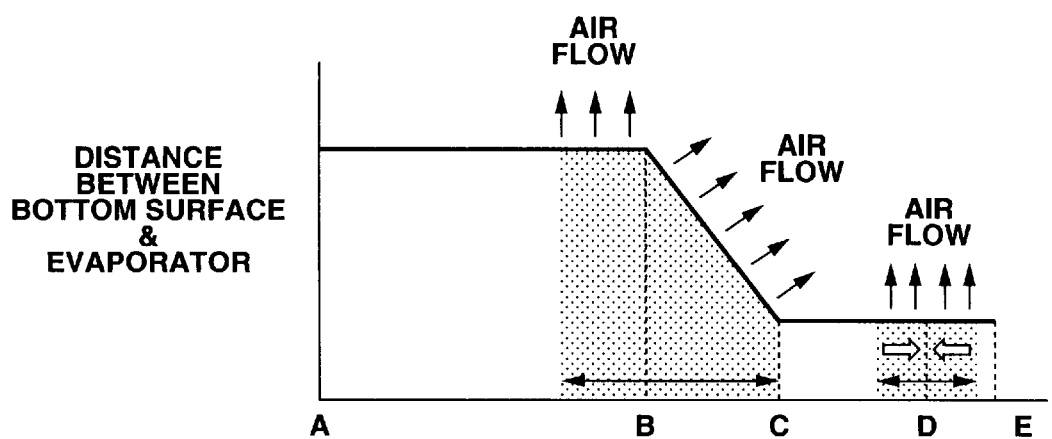
FIG. 24 is a graph depicting the manner of air flow at various positions in the known air conditioning unit.

As is seen from FIG. 5, under operation of the unit 10A, air from the air intake unit is enforcedly led, through the air inlet opening 12, into the air inlet chamber "AIC" defined below the evaporator 13. Because of the trapezoidal shape of the air inlet opening 12, the air flow rate at a large area A2 of the opening 12 is larger than that at a smaller area A1 of the opening 12. However, due to provision of the angled side 22 of the triangular projection 21, the larger volume of air flow from the larger area A2 is forced to turn leftward at a position A3, that is, toward the rear wall of the casing part 11A. Thus, around the position A3, the air pressure is increased and thus the amount of air passing through the evaporator 13 is also increased. The air flow turned at the position A3 comes to a position A4 where it mixes with a smaller volume of air flow from the smaller area A1 of the air inlet opening 12. Due to the angled surface possessed by the side 22, the air flow from the position A3 can smoothly mix with the smaller volume air flow from the smaller area A1. Then, the mixed air flow comes to a position A5 near the left wall of the casing 11, and turns toward a position A6 near the drain pipe 23. That is, the air flow from the larger area A2 of the air inlet opening 12 is forced to flow in a zigzag manner running around the triangular projection 21 toward the drain pipe 23. That is, due to provision of the triangular projection 21, undesired air flow collision, which would occur in the conventional air conditioning unit (see FIG. 21 & 22), is suppressed in the unit 10A of this first embodiment. Thus, energy loss of air flow is minimized and air flow resistance in the air inlet chamber "AIC" is minimized. Thus, a larger amount of air can be passed through the evaporator 13 and thus performance of the same is increased.

Figure 6:
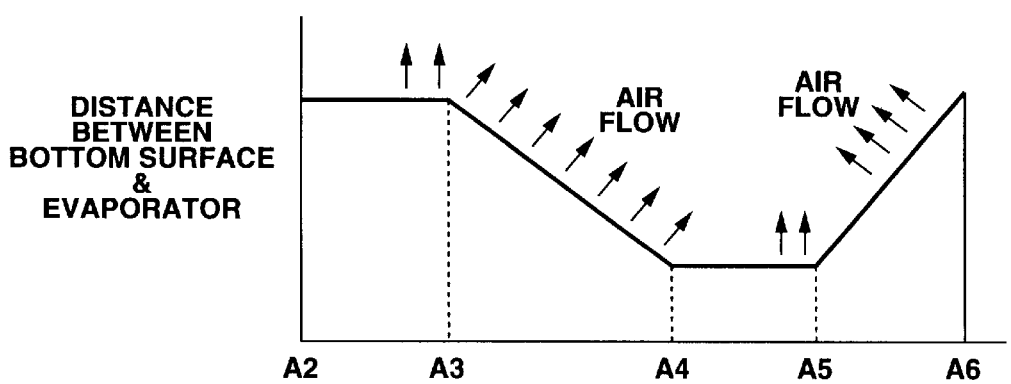
FIG. 6 is a graph depicting the manner of air flow at various positions in the air conditioning unit of the first embodiment.

FIG. 6 is a graph depicting the manner of the air flow at the positions of A2 to A6. As is seen from this graph, due to collision of the larger volume of air flow from the larger area A2 of the air inlet opening 12 with the angled side 22 of the projection 21, the pressure of the air at the position A3 increases and thus from the position A2 to the position A3, the speed of air passing through the evaporator 13 increases. Furthermore, at the positions A5 and A6, due to collision of the air flow with the side and front walls of the casing 11, the pressure at such positions increases and thus the speed of air passing through the evaporation 13 increases. Furthermore, because of the limited clearance between the smaller area A1 of the air inlet opening 12 and the evaporator 13, the smaller volume of air flow from the smaller area A1 is increased in pressure and thus the speed of air passing through the evaporator 13 at that clearance increases. With these increased speed of air flow at the various portions of the evaporator 13, cooling performance is satisfactorily exhibited by the evaporator 13.

Furthermore, in this embodiment, due to provision of the triangular projection 21, there is produced a certain air flow "CAF" (see FIG. 5) directed toward the drain pipe 23. Thus, condensed water drops "W" gathering on the bottom surface 20 of the casing 11 are forced to flow!toward the drain pipe 23 with the aid of the slanted water guide groove 24. That is, the condensed water drops "W" are effectively drained to the outside through the drain pipe 23.

Modifications of the first embodiment 10A will be described.

First, if the bottom surface 20 of the casing 11 is slanted toward the drain pipe 23, the water guide groove 24 may be removed. Second, in place of the triangular projection 21, a partition wall may be used, so long as it is inclined by an obtuse angle "θ" (see FIG. 4) with respect to a straight air flow "a" whose flowing direction is perpendicular to the air inlet opening 12.

Figure 7:
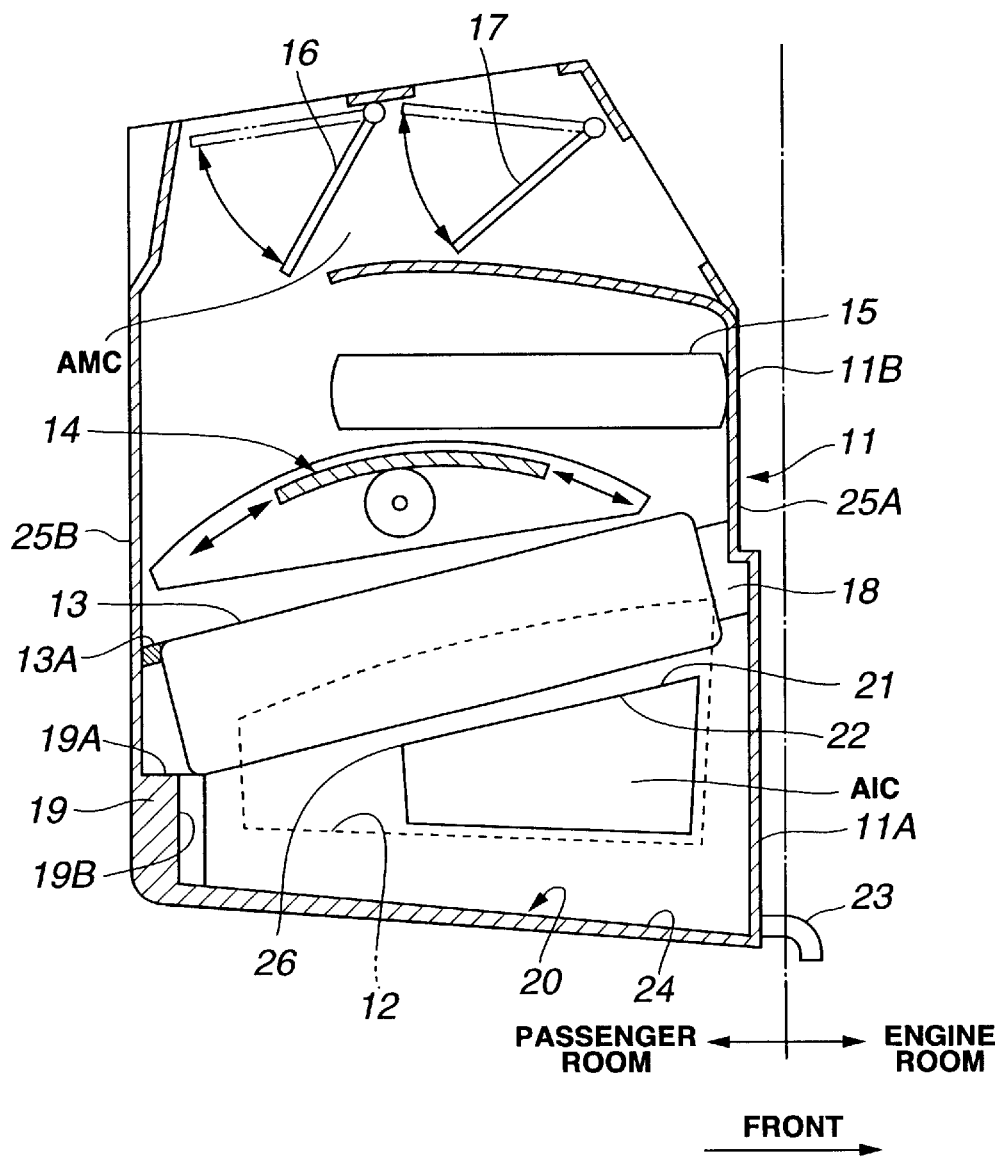
FIG. 7 is a view similar to FIG. 1, but showing an automotive air conditioning unit of a second embodiment of the present invention.

Referring to FIGS. 7, there is shown an automotive air conditioning unit 10B which is a second embodiment of the present invention.

Since this embodiment 10B is. similar in construction to the above-mentioned first embodiment 10A, only a portion different from that of the first embodiment 10A will be described in the following.

That is, in this second embodiment 10B, a plurality of slits 19B (see FIG. 3) defined by the stepped portion 19 of the lower half part 11A of the casing 11 are used to flow down the condensed water drops on the upper surface of the evaporator 13 toward the bottom surface 20 of the casing 11. That is, any water drops or water gathering on the step 19A of the stepped portion 19 can flow down to the air inlet chamber "AIC" through the slits 19B.

Figure 8:
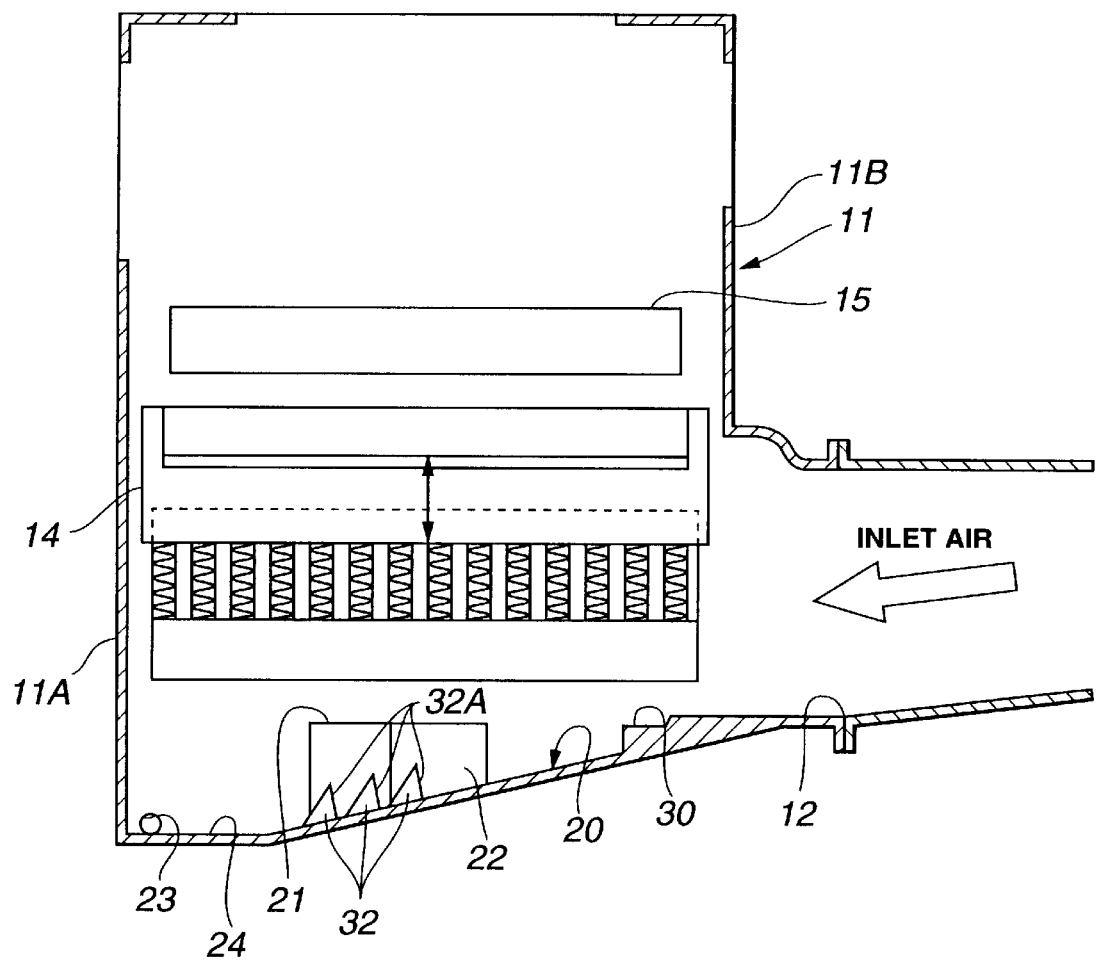
FIG. 8 is a view similar to FIG. 2, but showing an automotive air conditioning unit of a third embodiment of the present invention.
Figure 9:
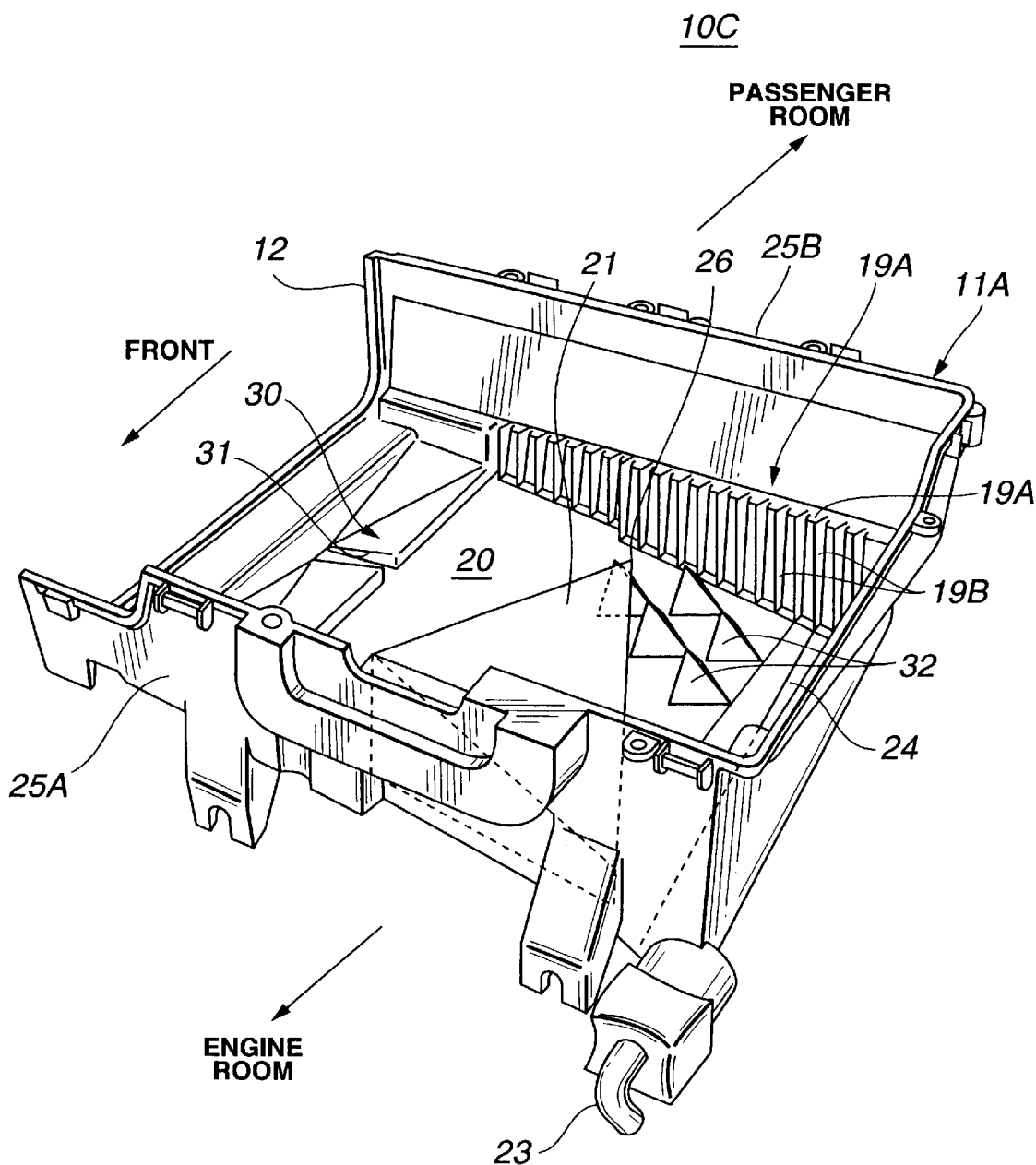
FIG. 9 is a perspective view of a lower half part of the air conditioning unit of the third embodiment.
Figure 10:
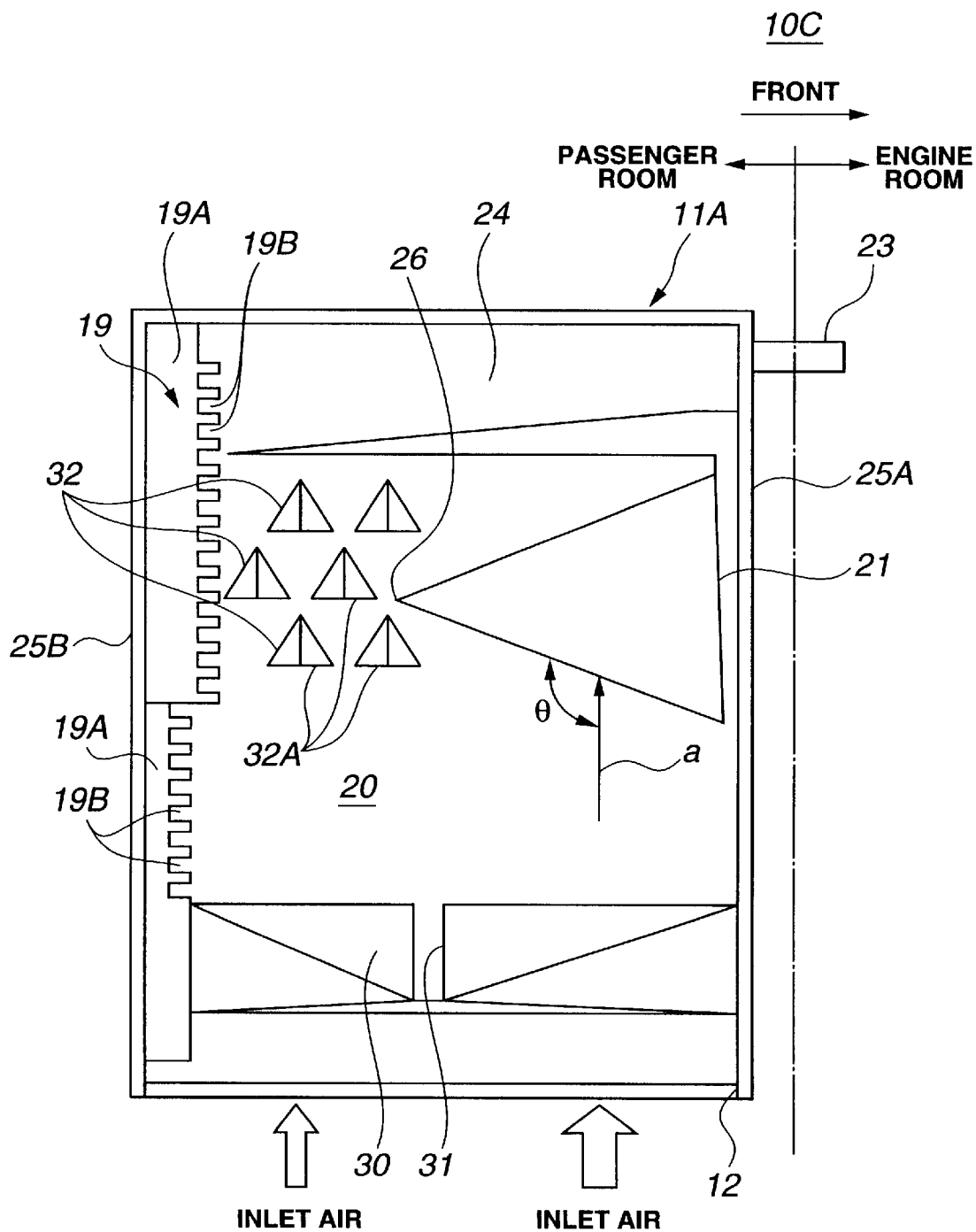
FIG. 10 is a plan view of the lower half part of the air conditioning unit of the third embodiment.
Figure 11:
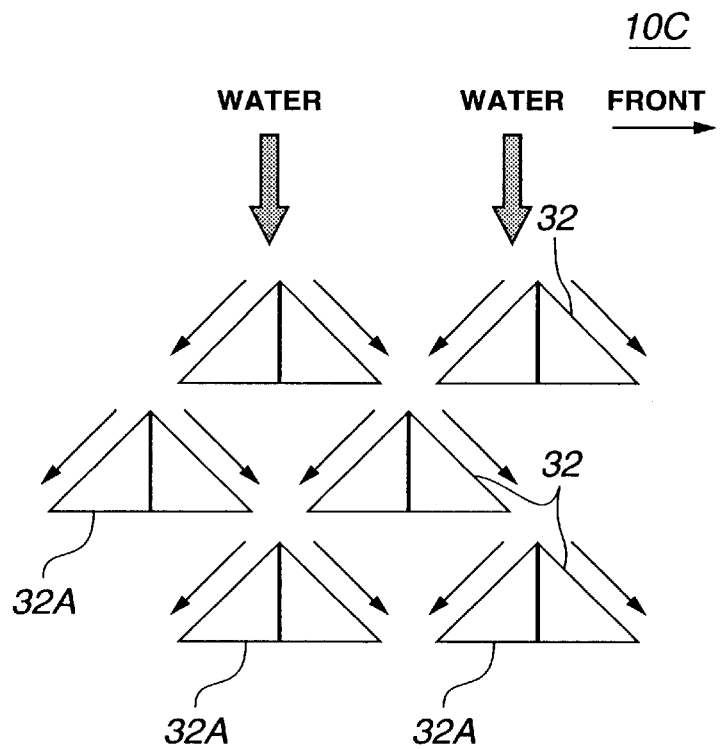
FIG. 11 is an illustration of water backflow obstruction projections which are employed in the air conditioning unit of the third embodiment.
Figure 12:
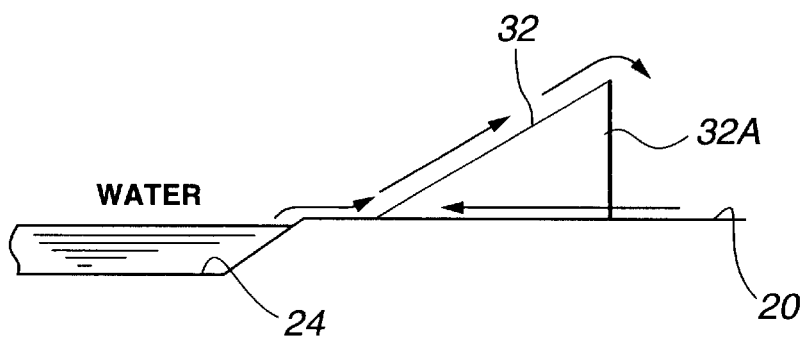
FIG. 12 is an illustration for explaining a possible backflow of water in case of the air conditioning unit of the third embodiment.

Referring to FIGS. 8 to 12, particularly FIGS. 8 to 10, there is shown an automotive air conditioning unit 10C which is a third embodiment of the present invention.

Since also this embodiment 10C is similar in construction to the above-mentioned first embodiment 10A, only portions different from those of the first embodiment 10A will be described in the following.

As will become apparent as the description proceeds, in the third embodiment 10C, unique measures are employed for much effectively suppressing or minimizing the undesired backflow of the condensed water drops or water on the bottom surface 20 of the casing 11 toward the air inlet opening 12.

As is well shown in FIGS. 9 and 10, six identical projections 32 are integrally formed on the bottom surface 20 of the lower half part 11A of the casing 11, each having a three-sided pyramidal shape. These projections 32 can be simultaneously provided when molding the lower half part 11A of the casing 11.

As is seen from FIG. 10, the projections 32 are equally spaced and arranged in a given zone that is defined between the triangular projection 21 and a rear wall 25B of the casing 11 where the stepped portion 19 is provided. That is, three pairs of projections 32 are arranged in a lateral direction of the casing 11, that is, in the direction of the width of the associated motor vehicle, keeping a given space therebetween. Furthermore, as shown, the center pair are displaced from the upstream and downstream pairs by a half pitch.

Each projection 32 has a triangular side 32A which faces toward the air inlet opening 12 and is substantially perpendicular to the bottom surface 20 of the casing 11, as is seen from FIGS. 8 and 10.

With the above-mentioned arrangement of the projections 32, the following advantages are expected in the third embodiment 10C of the invention in addition to the advantages obtained in the above-mentioned first and second embodiments 10A and 10B.

That is, when, due to turning of an associated motor vehicle or the like, a certain centrifugal force is applied to the casing 11, the water in the water guide groove 24 is urged to flow back on the bottom surface 20 toward the air inlet opening 12. However, as is seen from FIG. 11, due to provision of the projections 32, the back flow of the water is obstructed. That is, as is seen from this drawing, the back flow is split into several branch flows by the projections 32 while reducing its kinetic energy. Furthermore, as is understood from FIG. 12, rising of water onto the projections 32 brings about a reduction in kinetic energy possessed by the water. Thus, the undesired back flow of water toward the air inlet opening 12 is suppressed or at least minimized.

If desired, such three-sided pyramidal projections 32 may be arranged entirely on the bottom surface 20 of the casing 11 except the water guide groove 24.

Figure 13:
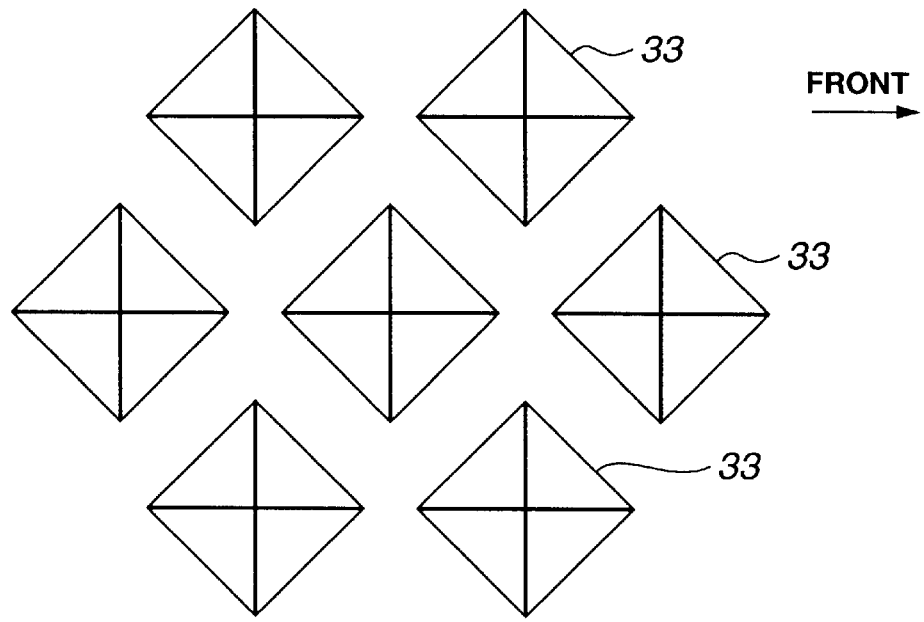
FIG. 13 is an illustration of water backflow obstruction projections which are employed in a first modification of the third embodiment.

Referring to FIG. 13, there is shown a first modification 10C-1 of the third embodiment 10C. That is, in this modification, in place of the above-mentioned three-sided pyramidal projections 32, four-sided pyramidal projections 33 are used. In the illustrated modification, seven projections 33 are provided. That is, three aligned projections 33 are spaced from the upstream and downstream pairs by a half pitch in a lateral direction, that is, in the direction of the width of an associated motor vehicle. Of course, substantially same advantageous operation as that of the third embodiment 10C is expected.

Figure 14:
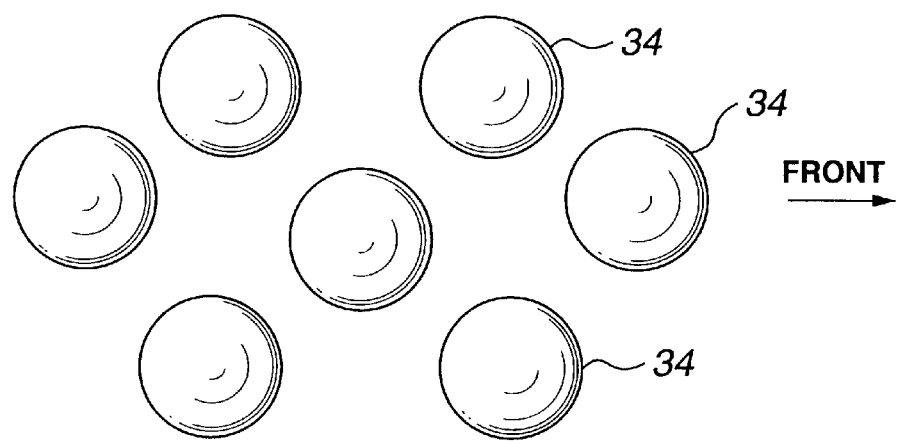
FIG. 14 is an illustration of water backflow obstruction projections which are employed in a second modification of the third embodiment.
Figure 15:
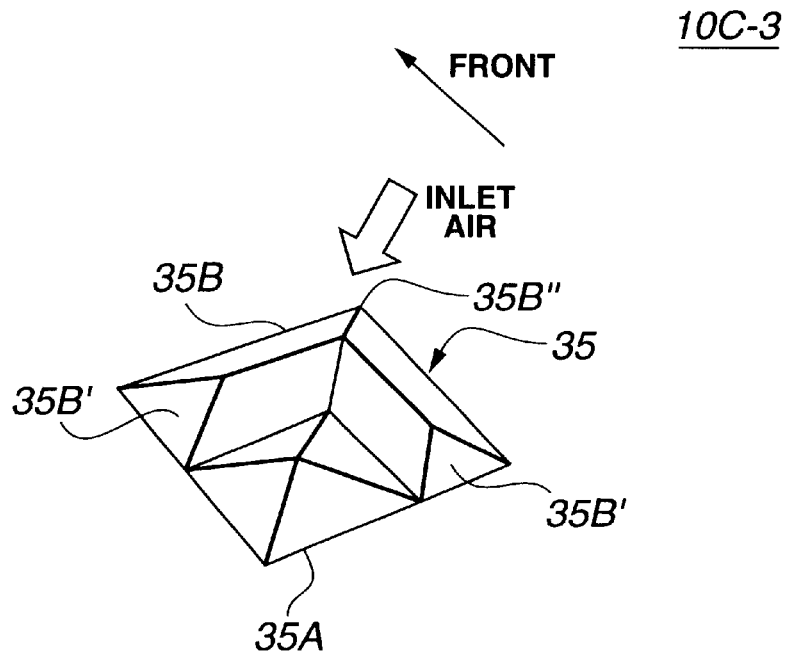
FIG. 15 is a perspective view of one of water backflow obstruction projections which are employed in a third modification of the third embodiment.

Referring to FIG. 14, there is shown a second modification 10C-2 of the third embodiment 10C. That is, in this modification, in place of the three-sided pyramidal projections 32, hemispherical projections 34 are employed, as shown. These hemispherical projections 34 are arranged in substantially the same manner as in the above-mentioned first modification 10C-1 of FIG. 13.

Figure 16:
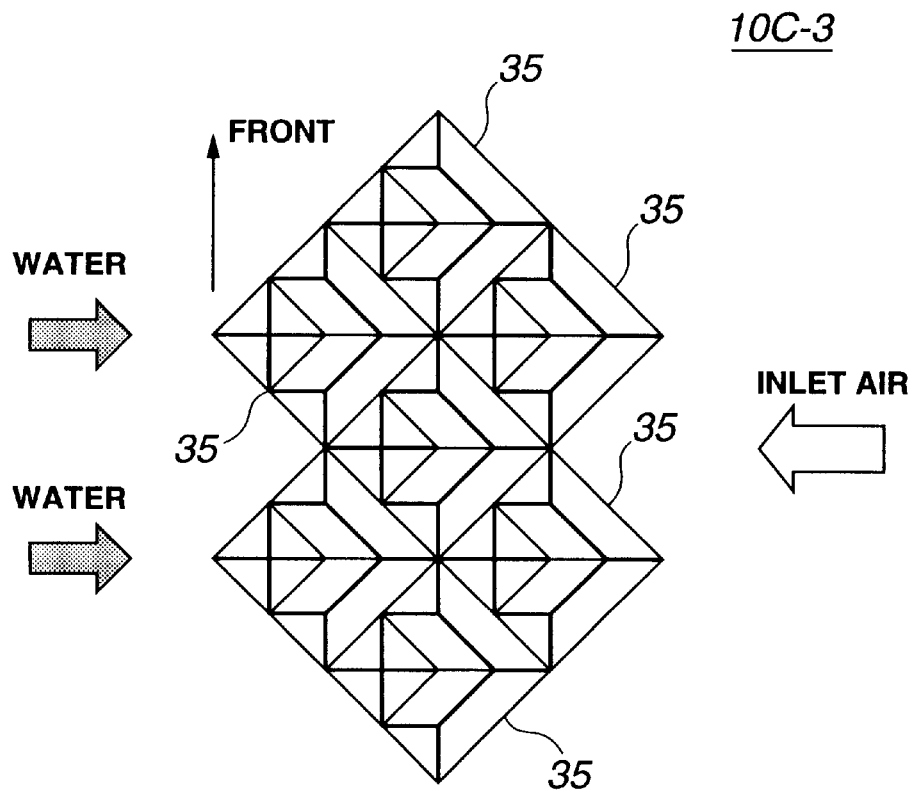
FIG. 16 is an illustration for explaining one practical arrangement of the water backflow obstruction projections employed in the third modification.
Figure 17:
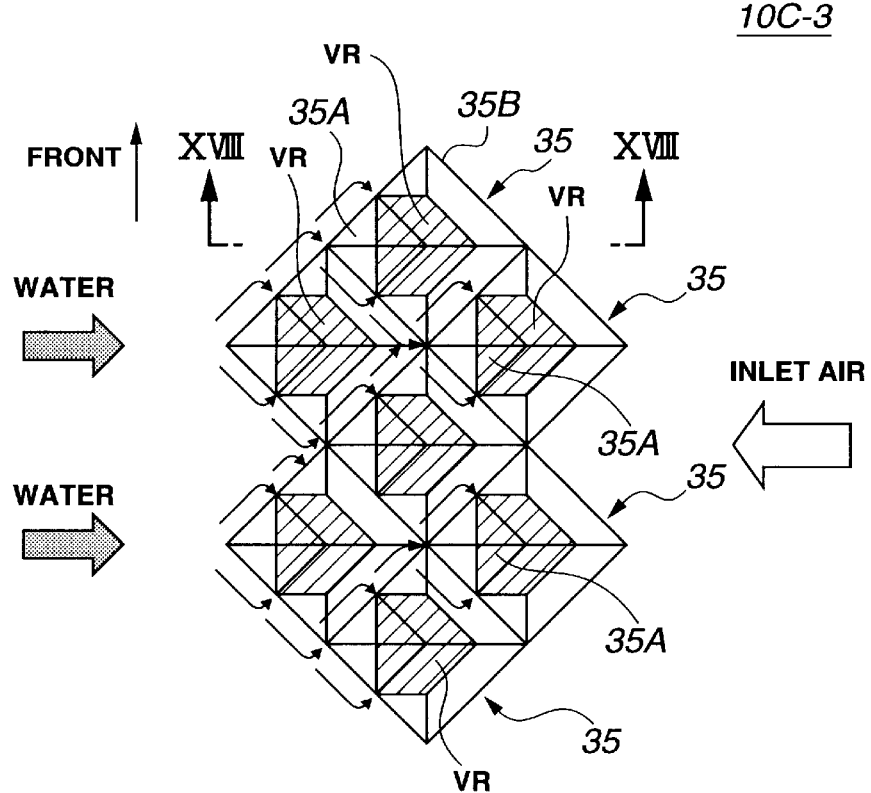
FIG. 17 is an illustration for explaining the manner in which water and inlet air behave under operation of the air conditioning unit of the third modification.

Referring to FIGS. 15 to 18B, particularly FIG. 16, there is shown a third modification 10C-3 of the third embodiment 10C. As shown, in this modification, a plurality of projections 35 are used in place of the three-sided pyramidal projections 32 of the first modification 10C-1. As is seen from FIG. 15, each projection 35 comprises a four-sided pyramidal portion 35A and an L-shaped rib portion 35B which surrounds a half of the four-sided pyramidal portion 35A. The L-shaped rib portion 35B has a generally triangular cross section and has mutually right angled opposed end sides 35B' each being slanted upward. The L-shaped rib portion 35B is higher than the four-sided pyramidal portion 35A. These projections 35 are arranged in substantially the same manner as in the above-mentioned first modification 10C-1 of FIG. 13. As is understood from FIG. 15, each projection 35 is oriented so that a bent portion 35B" of the L-shaped rib portion 35B is directed toward the air inlet opening 12, that is, against the flow of the inlet air.

An example of arrangement of the projections 35 is shown in FIG. 16. In this example, seven projections 35 are employed, which are closely arranged while being directed toward the same direction. In this example, the following advantages are expected, which will be described with reference to FIGS. 17, 18A and 18B.

That is, when, due to turning of an associated motor vehicle or the like, water in the water guide groove 24 is urged to flow back on the bottom surface 20 toward the air inlet opening 12, the cluster of the projections 35 obstructs such back flow of the water. That is, the water back flow is split into several branch flows by the four-sided pyramidal portions 35A of the projections 35. Each pyramidal portion 35A thus serves as a water splitter. The water flow split is then collected in a V-shaped recess "VR" which is defined between each four-sided pyramidal portion 35A and the associated L-shaped rib portion 35B, as is seen from FIG. 18A. Water overflowing the V-shaped recess "VR" is collected in V-shaped recesses "VR" positioned behind the recess "VR". Continuing this movement, the water from the water guide groove 24 is dispersed over the bottom surface 20 while reducing its kinetic energy. Thus, undesired back flow of water toward the inlet opening 12 is suppressed or at least minimized.

Figure 18A:
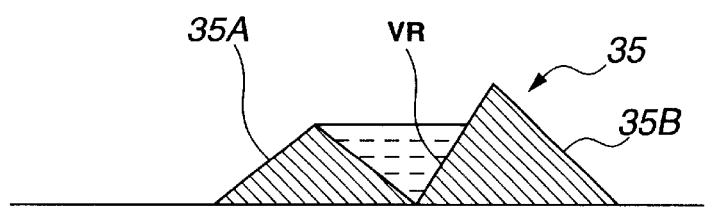
FIGS. 18A and 18B are illustrations showing the function of each water backflow obstruction projection of the third modification.
Figure 18B:
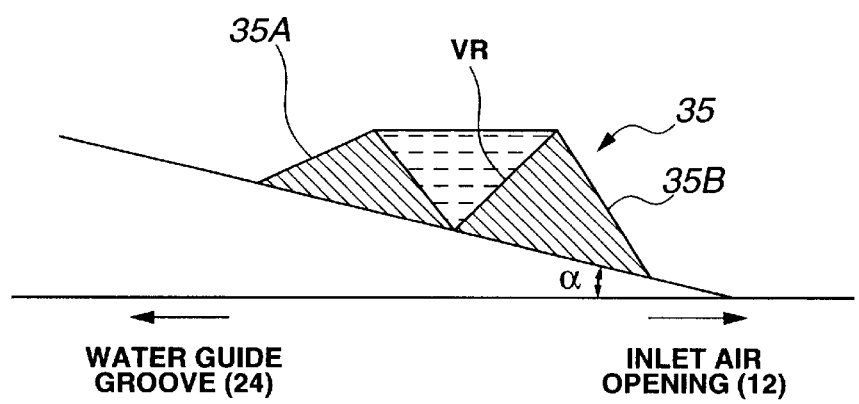

As is seen from FIG. 18B, when the associated motor vehicle leans to the right, that is, when the vehicle leans in such a direction that the side of the water guide groove 24 is raised, the V-shaped recess "VR" of each projection 35 increases its volume, which promotes the water back flow obstruction function effectively. While, when the motor vehicle leans to the left, water in the recess "VR" smoothly flows toward the water guide groove 24.

Figure 19:
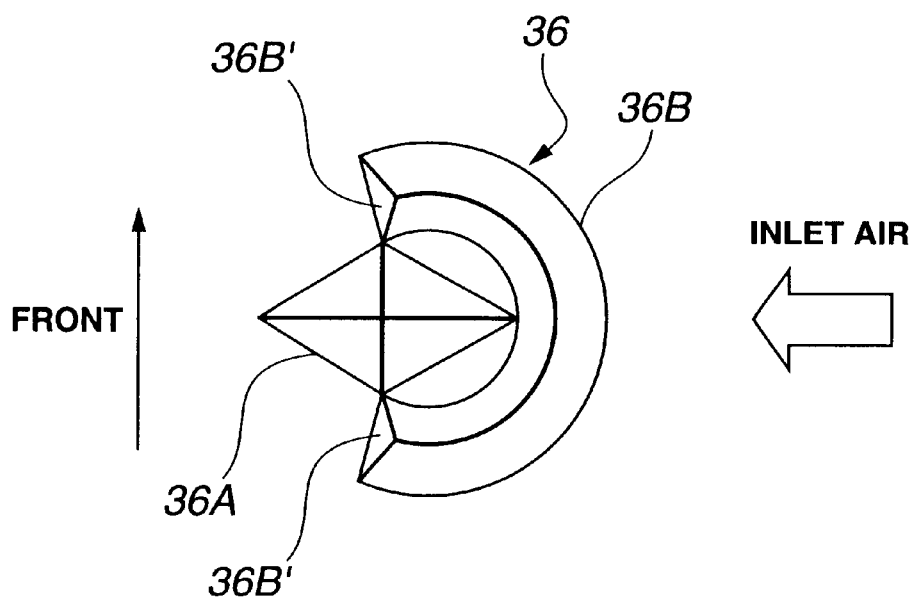
FIG. 19 is a plan view of one of water backflow obstruction projections which are employed in a fourth modification of the third embodiment.

Referring to FIG. 19, there is shown a fourth modification 10C-4 of the third embodiment 10C. That is, a plurality of projections 36 are used, which are arranged in substantially the same manner as in the above-mentioned first modification 10C-1. Each projection 36 comprises a four-sided pyramidal portion 36A which is somewhat elongated in a lateral direction, and an arcuate rib portion 36B which surrounds a half of the four-sided pyramidal portion 36A. The arcuate rib portion 36B has a generally triangular cross section and has opposed end sides 36B' each being slanted upward. The arcuate rib portion 36B is higher than the four-sided pyramidal portion 36A. As is seen from the drawing, each projection 36 is oriented so that the arcuate rib portion 36B is directed toward the air inlet opening 12, that is, against the flow of the inlet air.

Figure 20:
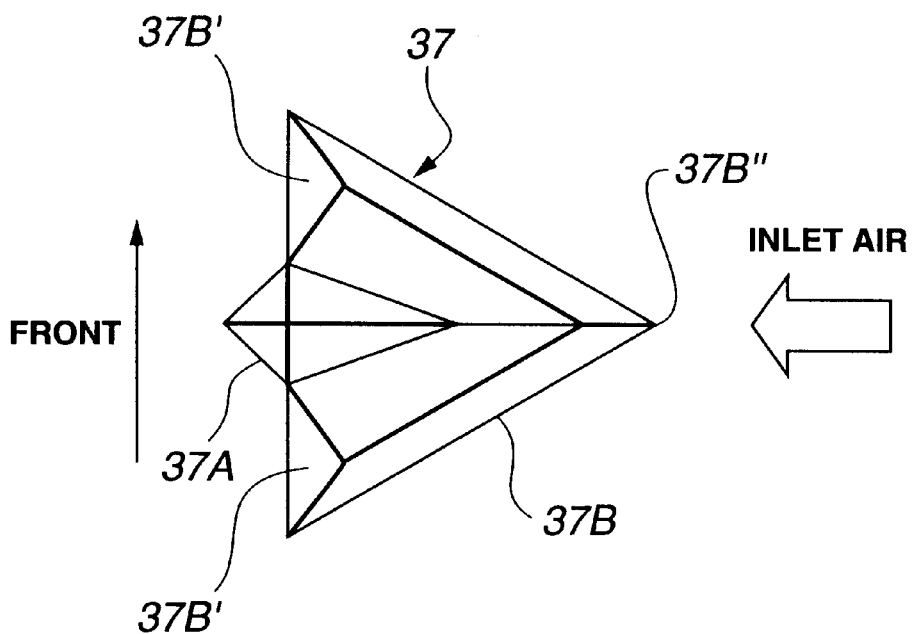
FIG. 20 is a plan view of one of water backflow obstruction projections which are employed in a fifth modification of the third embodiment.

Referring to FIG. 20, there is shown a fifth modification 10C-5 of the third embodiment 10C. A plurality of projections 37 are used, which are arranged in substantially the same manner as in the above-mentioned first modification 10C-1. Each projection 37 comprises a four-sided pyramidal portion 37A which is somewhat elongated in a lateral direction, and a V-shaped rib portion 37B which surrounds a half of the four-sided pyramidal portion 37A. The V-shaped rib portion 37B has a generally triangular cross section and has opposed end sides 37B' each being slanted upward. The V-shaped rib portion 37B is higher than the four-sided pyramidal portion 37A. Each projection 37 is oriented so that a bent portion 37B" of the V-shaped rib portion 37B is directed toward the air inlet opening 12, that is, against the flow of the inlet air.

The entire contents of Japanese Patent Applications 11-333130 (filed Nov. 24, 1999), 11-332056 (filed Nov. 22, 1999), 11-332039 (filed Nov. 22, 1999) and 2000-312083 (filed Oct. 12, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:
1. An air conditioning unit comprising:
a casing including a front wall, a rear wall, a right wall, a left wall, a bottom wall and a top wall, said right and top walls having air inlet and outlet openings respectively which are connected through an air flow passage defined in said casing, said bottom wall including a bottom surface, said air inlet opening being generally trapezoidal in shape so that the height of a front side of said air inlet opening is greater than that of a rear side of the air inlet opening;
an evaporator arranged in said air flow passage and inclined relative to said bottom wall;
a heater arranged in said air flow passage at a position downstream of said evaporator;
an air flow control door for controlling a rate between an air amount flowing in a heater-bypassing passage which extends from the evaporator to the air outlet opening bypassing the heater and an air amount flowing in a heater-passing passage which extends from the evaporator to the air outlet opening through the heater;
a water guide groove provided at the bottom surface of said casing near said left wall and extending along the same, said water guide groove having a slanted bottom;
a drain pipe held by said casing and connected to a lower portion of said water guide grove; and
a triangular projection formed on said bottom surface of said casing, said triangular projection being oriented so that one apex of the projection is directed toward said rear wall of said casing and a side positioned opposite to said apex faces toward said front wall of said casing.

2. An air conditioning unit as claimed in claim 1, in which said bottom surface is slanted down toward said water guide groove, and in which a bottom of said water guide groove is slanted toward said drain pipe.

3. An air conditioning unit as claimed in claim 1, in which said evaporator and said heater are inclined with respect to said air flow passage of the casing.

4. An air conditioning unit as claimed in claim 3, in which said casing is formed with a stepped portion for supporting a lower edge of the inclined evaporator, said stepped portion being formed with vertically extending slits.

5. An air conditioning unit as claimed in claim 4, in which said casing comprises a lower half part and an upper half part which are detachably coupled.

6. An air conditioning unit as claimed in claim 1, further comprising a dam structure formed on said bottom surface near said right wall, said dam structure having a slanted groove which has a lower end merged with said bottom surface.

7. An air conditioning unit as claimed in claim 1, further comprising a plurality of water backflow obstruction projections formed on said bottom surface in an area defined between said water guide groove and said air inlet opening, each projection being shaped and oriented so as to obstruct a flow of water in a direction from said water guide groove toward said air inlet opening.

8. An air conditioning unit as claimed in claim 7, in which said water backflow obstruction projections are the same in shape.

9. An air conditioning unit as claimed in claim 8, in which said projections are spaced from one another.

10. An air conditioning unit as claimed in claim 9, in which said projections are arranged to form a plurality of lines in a direction perpendicular to said air inlet opening.

11. An air conditioning unit as claimed in claim 10, in which said plurality of lines are spaced apart from one another in an upstream and downstream direction by a half pitch.

12. An air conditioning unit as claimed in claim 7, in which each of said water backflow obstruction projections is in a three-sided pyramidal shape, one of the three sides of each water backflow obstruction projection being a triangular side which faces toward the air inlet opening and is substantially perpendicular to the bottom surface of the casing.

13. An air conditioning unit as claimed in claim 7, in which each of said water backflow obstruction projections comprises one of a four-sided pyramidal shape and a hemispherical shape.

14. An air conditioning unit as claimed in claim 7, in which each of said water backflow obstruction projections comprises a first part and a second part which surrounds generally a half of said first part, said second part being higher than said first part, each of said water backflow obstruction projections being oriented in such a manner that said second part is directed toward said air inlet opening and said first part is directed toward said water guide groove.

15. An air conditioning unit as claimed in claim 14, in which said first part includes a four-sided pyramidal portion and said second part includes an L-shaped rib portion, said L-shaped rib portion having a generally triangular cross section and having mutually right angled opposed end sides each being slanted upward.

16. An air conditioning unit as claimed in claim 14, in which said first part includes a four-sided pyramidal portion which is elongated in a lateral direction and said second part includes an arcuate rib portion, said arcuate rib portion having a generally triangular cross section and having opposed end sides each being slanted upward.

17. An air conditioning unit as claimed in claim 14, in which said first part includes a four-sided pyramidal portion which is elongated in a lateral direction and said second part includes a generally V-shaped rib portion, said V-shaped rib portion having a generally triangular cross section and having opposed end sides each being slanted upward.

18. An air conditioning unit comprising:

a casing including a front wall, a rear wall, a right wall, a left wall, a bottom wall and a top wall, said right and top walls having air inlet and outlet openings respectively which are connected through an air flow passage defined in said casing, said bottom wall including a bottom surface which is slanted down toward said left wall from said right wall, said air inlet opening being generally trapezoidal in shape so that the height of a front side of said air inlet opening is greater than that of a rear side of the air inlet opening;

an evaporator arranged in said air flow passage and inclined relative to said bottom wall;

a heater arranged in said air flow passage at a position downstream of said evaporator;

an air flow control door for controlling a rate between an air amount flowing in a heater-bypassing passage which extends from the evaporator to the air outlet opening bypassing the heater and an air amount flowing in a heater-passing passage which extends from the evaporator to the air outlet opening through the heater;

a water guide groove provided at the bottom surface of said casing near said left wall and extending along the same, said water guide groove having a slanted bottom; and a triangular projection formed on said bottom surface of said casing, said triangular projection being oriented so that one apex of the projection is directed toward said rear wall of said casing and a side positioned opposite to said apex faces toward said front wall of said casing.

\* \* \* \* \*